March 27, 1962 J. H. DAVIS 3,027,519

GAIN-VERSUS-BANDWIDTH CONTROL AMPLIFIER PARTICULARLY ADAPTED FOR TELEVISION CIRCUITRY

Filed April 21, 1959 2 Sheets-Sheet 1

INVENTOR

JACK H. DAVIS

BY K. G. Doub

ATTORNEY

March 27, 1962 J. H. DAVIS 3,027,519

GAIN-VERSUS-BANDWIDTH CONTROL AMPLIFIER PARTICULARLY ADAPTED FOR TELEVISION CIRCUITRY

Filed April 21, 1959 2 Sheets-Sheet 2

INVENTOR

JACK H. DAVIS

BY K. G. Doub

ATTORNEY

United States Patent Office 3,027,519

Patented Mar. 27, 1962

3,027,519

GAIN-VERSUS-BANDWIDTH CONTROL AMPLIFIER PARTICULARLY ADAPTED FOR TELEVISION CIRCUITRY

Jack H. Davis, Baltimore, Md., assignor to The Bendix Corporation, a corporation of Delaware Filed Apr. 21, 1959, Ser. No. 807,874

3 Claims. (Cl. 330—85)

It is known in radio and video or television signal amplification to provide an automatic control for a feedback amplifier operating to decrease the acceptance band for weak signals and increase the acceptance band for stronger signals. Such amplifiers, however, utilize negative feedback to vary the bias on the signal input electrode by way of an automatic gain control circuit or employ other methods of control which affect the sensitivity and gain of the amplifier. Hence such an amplifier may lack the characteristics required for low light level television circuitry. In television systems of the latter type, at low light levels the signal level is correspondingly low and the required bandwidth is narrow whereas at relatively high light levels, full bandwidth may be required. Under such circumstances it is of advantage to "trade" the bandwidth for gain, and vice versa; and an object of the present invention is to provide an amplifier which will perform this function without loss of sensitivity. In carrying out this object, I provide a primary signal amplifier which without feedback has a high gain and relatively narrow band-pass characteristic, determined by the formula $$F=\frac{1}{2\pi RC}$$

where F is upper three-decibel limit of bandpass, R plate load resistance and C output capacitance to ground; and operatively associated with this primary amplifier is a particular type of feedback control amplifier and degenerative feedback network which accurately regulates the feedback voltage as a function of changes in a control potential, as for example changes in the output signal level of a television pickup tube.

Another object is to provide an automatic gain-versus-bandwidth amplifier in which the gain and bandwidth is determined by the amount of feedback independently of the signal input system.

A further object is to provide an automatic gain-versus-bandwidth type of amplifier particularly adapted for low light level television circuitry which in effect constitutes a separate unit adapted for automatic control circuits of various types.

The foregoing and other objects and advantages will become apparent in view of the following description taken in conjunction with the drawings, wherein.

Figure 1:
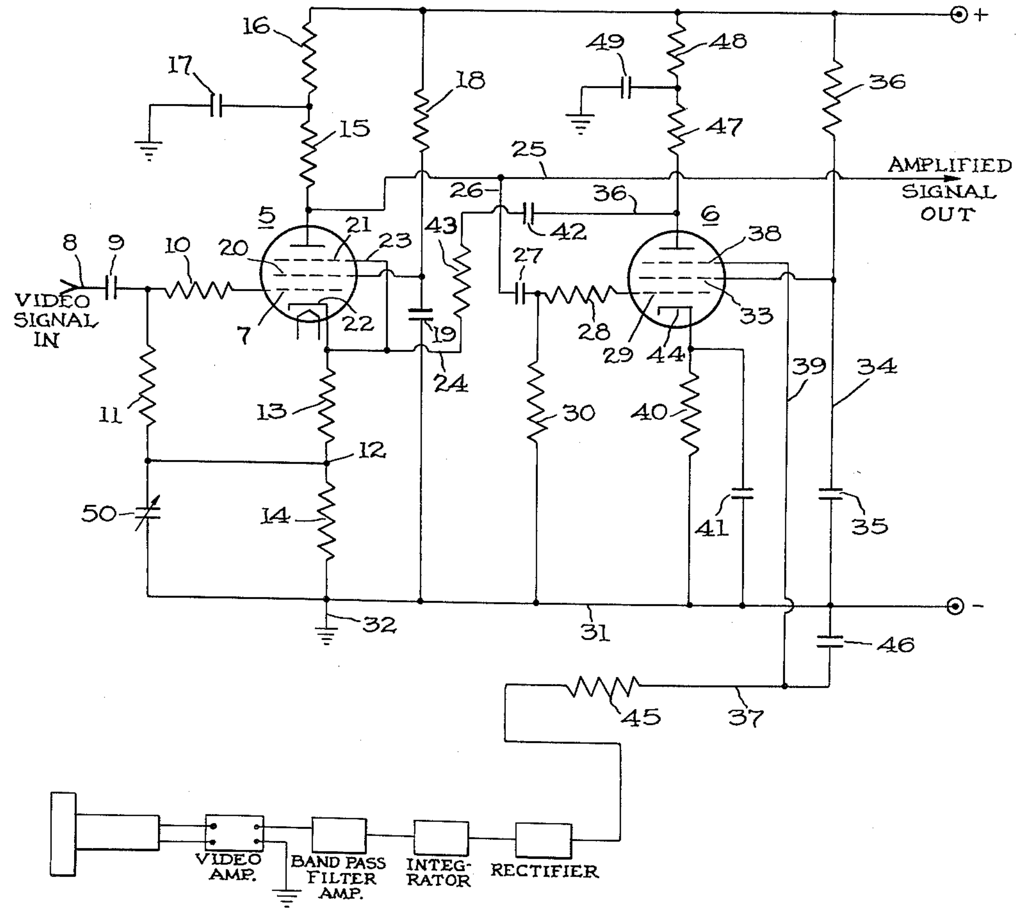
FIG. 1 is an electrical diagram of an amplifier in accordance with the invention, operatively related to the pickup tube of a closed-circuit television system.

Referring to the drawings in detail and first to FIG. 1, a primary signal amplifier is indicated at 5 and an associated feedback amplifier at 6. The amplifier 5 comprises an electron discharge device in the form of a pentode having its control electrode or grid 7 connected to the input line 8 across coupling capacitor 9 and damping resistor 10. Grid return resistor 11 has one end connected to the junction 12 of resistors 13 and 14, which form part of a feedback voltage divider network in a manner to be described, the bias for the electron discharge device 5 being provided by the voltage drop across resistor 13. Plate load resistor 15 is of a value such as to provide the necessary initial gain and together with any tube-output and stray capacitance determines the initial bandwidth of the amplifier 5 when gain of the amplifier 6 is zero. Resistor 16 and capacitor 17 are the usual decoupling resistor and bypass capacitor, respectively for the plate supply, while 18 and 19 are the supply-dropping resistor and bypass capacitor for the screen grid 20. Suppressor grid 21 is returned to the cathode 22 by way of conductors 23 and 24. Should the electron discharge device of 5 be in the form of a semi-conductor such as a transistor, the cathode 22 would be the conventional emitter or similar electron or "hole" emitting component. The output of amplifier 5 is fed by way of line 25 to another stage of amplification, a video detector or other signal-processing component, not shown.

The output signal as amplified and reversed in phase during its passage through 5, is fed via conductor 26, coupling capacitor 27 and damper resistor 28 to the signal-input or "first control" electrode grid 29 of feedback amplifier 6, which is shown in the form of a pentode of the 6AS6 type. Grid return resistor 30 is connected to the B-minus line 31, which is grounded at 32. The screen grid 33 is also connected to the B-minus side of the system by way of conductor 34 across condenser 35, and to the B-plus supply across resistor 36. The resistor 36 and capacitor 35 function, respectively, to supply the necessary potential to the grid 33, and bypass any signal fluctuations that may be present on said latter grid. What may be considered the "second control electrode" for the feedback amplifier is the suppressor grid 38, which is connected to a control line 37 by way of conductor 39. Resistor 40 provides the bias for the grid 29 and it also establishes the initial minimum bias for the control grid 38, while the capacitor 41 is the usual bypass capacitor.

The signal as amplified and reversed in phase by 6 is supplied as automatically controlled negative or degenerative feedback voltage via capacitor 42 and resistor 43 to the electron-emitter circuit, which includes the cathode 22 of the electron discharge device 5, the amount of feedback being determined by the ratio of resistor 13 plus resistor 14 over resistor 43 multiplied by the gain in amplifier 6

$$A\left(\frac{R_{13}+R_{14}}{R_{43}+R_{13}+R_{14}}\right)=\beta$$

where A represents gain and beta the fraction of output of 5 fed back. No feedback will take place when 6 is not amplifying, i.e. when $A=0$, which will occur when the control voltage on grid 38 is at some given negative value with reference to cathode 44, depending upon tube characteristics, and maximum feedback will occur when control grid 38 has the same potential as cathode 44.

The control voltage for the feedback amplifier 6 is fed to the control electrode or grid 38 by way of line 37 and conductor 39. As shown, the control line is connected to a television pickup tube signal integrator and detector, although other sources of control may be utilized. Resistor 45 and capacitor 46 constitute an integrating network for filtering out any noise or unwanted frequencies from the control voltage; their relative values are determined by the type of control voltage; they may be eliminated for high frequency control voltages.

The gain of amplifier 6, in the circuit shown, is a function of the relative values of load-resistor 47 in the plate circuit in parallel with the feedback network comprising resistors 13 and 14. Resistor 48 and capacitor 49 decouple the B-plus voltage from the feedback amplifier 6. Variable capacitor 50 serves as a partial bypass for resistor 14 between grid return resistor 11 and ground; it may be used to extend the frequency range of the amplifier by cutting out the feedback response at a predetermined frequency, depending upon the fall-off in gain of 6 due to stray capacitances across 47.

*Operation*

Figure 2:
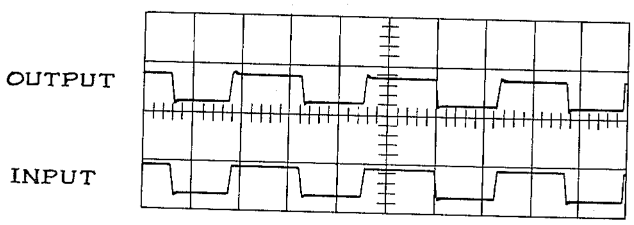
FIGS. 2 and 2A are oscilloscope pictures of amplified output signals or waveforms taken at minimum and maximum values of feedback control voltages for a particular video amplifier constructed according to FIG. 1.
Figure 2A:
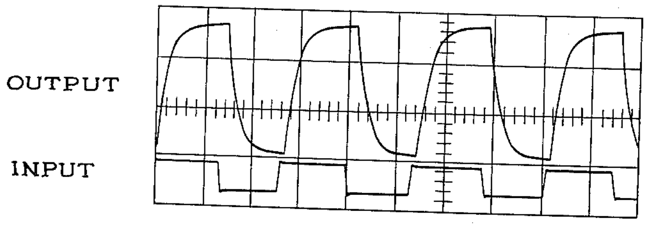
Figure 3:
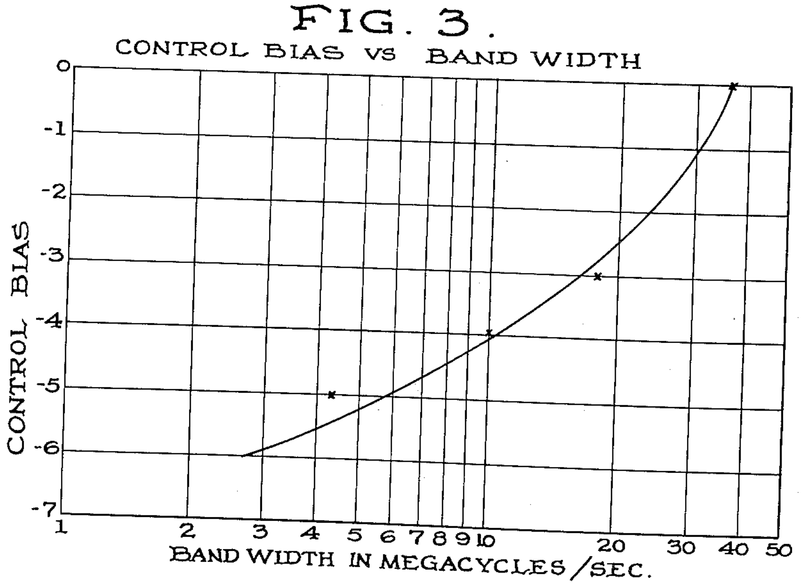
FIG. 3 is a curve chart depicting the control bias v. bandwidth characteristics of the amplifier of FIGS. 2 and 2A.

Obviously the amplifier of FIG. 1 may constitute a single stage or it may be one of a multistage group. Hence the input line 8 may be the output from a preceding stage, a pickup tube or other component, and the output line 25 may deliver to a succeeding stage or to a detector or other point in the video signal circuit. Signals impressed on grid 7 of the primary amplifier 5 are amplified and reversed in phase and fed via line 26, coupling capacitor 27 and damping resistor 28 to the grid 29 of the feedback amplifier 6. Let it be assumed that at a given instant the control voltage or bias on control grid 38 is such as to reduce tube conduction to a minimum, in which event there would be little or no feedback, the gain of the primary amplifier 5 would be maximum and the bandpass correspondingly narrow. Tests run on an amplifier constructed in accordance with FIG. 1 produced input and output signals or waveforms under these conditions as illustrated in FIG. 2A at the bottom and top, respectively, which are oscilloscope pictures with the control voltage on grid 38 of 6 at, for example, −8 volts. This would normally be the control voltage at low light or signal levels. If now the control voltage on grid 38 is varied in a direction to increase the conduction or gain of amplifier 6, the gain of the primary amplifier 5 would correspondingly decrease, whereupon the bandpass will be correspondingly broadened. The input and output signals or waveforms under these conditions are illustrated in FIG. 2, at the bottom and top, respectively, which are oscilloscope pictures with the control voltage on grid 38 of 6 at zero volts. The curve of FIG. 3 was plotted as the results of tests run on the same amplifier as that mentioned in connection with FIGS. 2 and 2A. Mathematically, control of gain and bandwidth is by variation of $\beta$ in the formula $$\frac{A}{1+\beta A}$$

where A is gain of the amplification stage and $\beta$ is the fraction of output fed back, the bias on the control grid 7 of the primary amplifier 5 being unaffected by the feedback voltage. As heretofore indicated, the amount of feedback for any given control voltage setting and hence gain of amplifier 6 is a direct function of the voltage divider circuit comprised of resistors 13, 14 and 43. Since the bias on amplifier 5 remains constant for a given B-plus potential, gain and bandwidth control is a direct function of the rate of negative feedback, which in turn is solely responsive to the voltage impressed on the control electrode or grid 38 of amplifier 6.

The low frequency response can be extended as far as required without feedback by selecting a large capacitor 42 to reduce the effect of rise in gain at frequencies approaching zero frequency when feedback is applied. By properly proportioning capacitor 49 and resistor 48, the response can be made flat to a very low frequency.

As shown at the bottom of FIG. 1, the control line 37 has impressed thereon a direct current control voltage which varies with variations in the signal output of a television pickup tube. In this manner, the control voltage or bias on grid 38 will automatically vary with changes in the signal level.

While the gain-versus-bandwidth amplifier disclosed herein is particularly adapted for television circuitry where extremely low light level conditions are encountered, yet the control line 37 can readily be connected to other sources of control voltages, depending upon the particular installation involved.

What I claim is:

1. In a television system having a pickup device and means for amplifying the video signal output thereof including a stage of amplification comprising: a degenerative feedback type video signal amplifier having a high gain and narrow bandpass characteristic under minimum feedback conditions and also having the characteristic that when the gain is reduced the width of the bandpass is increased and vice versa, a video signal input circuit and an amplified video signal output circuit; a first electron discharge device having a control electrode coupled to said input circuit and a discharge electrode feeding amplified signals to said output circuit; a feedback control including a second electron discharge device having a signal input electrode, a discharge electrode and a conduction-control electrode, said input electrode being coupled to said output circuit; a degenerative feedback network connecting the discharge electrode of said second device to said first device in a manner such as to vary the gain and frequency response of said first device as a function of variations in gain of said second device, and a control circuit connecting a source of control potential to said control electrode varying inversely with the amplitude of the video signal output of said pickup device.

2. In a television system having a pickup device and means for amplifying the video signal output thereof including a stage of amplification comprising: a degenerative feedback type electronic signal amplifier having a high gain and narrow bandpass characteristic under minimum feedback conditions and also having the characteristic that when the gain is reduced the width of the bandpass is increased and vice versa, a video signal input circuit and an amplified video signal output circuit; a first electron discharge device having a control electrode coupled to said input circuit, a discharge electrode connected to said output circuit, and an emitter element and associated circuit; a second electron discharge device for controlling the amplitude of the feedback signal having an input electrode, a discharge electrode and a conduction-control electrode, said input electrode being coupled to said output circuit; a degenerative feedback network connecting the discharge electrode of said second device to the emitter circuit of said first-named discharge device whereby the gain and frequency response of said first device varies inversely with variations in the gain of said second device, said discharge electrode of said second device having no connection with said output circuit, and a control circuit connecting the control electrode of said second device with a source of control potential varying inversely with the amplitude of the video signal output of said pickup device.

3. In a television system having a pickup device and means for amplifying the video output signals thereof including a stage of amplification comprising: a degenerative feedback type electronic signal amplifier having a high gain and narrow bandpass characteristic under minimum feedback conditions and also having the characteristic that when the gain is reduced the width of the bandpass is increased and vice versa, a video signal input circuit and an amplified video signal output circuit; a first electron discharge device having a control electrode coupled to said input circuit, a discharge electrode connected to said output circuit, and an electron emitter element provided with a circuit to ground or return side of the system having a resistance divider network therein; a second electron discharge device for controlling the rate of feedback having a signal input electrode coupled to said output circuit, a discharge electrode having no connection with said output circuit, and a conduction-control electrode; a degenerative feedback circuit coupling the discharge electrode of said second electron discharge device with the emitter circuit of said first electron discharge device at a point between the emitter element and said voltage divider network, said feedback circuit having a resistor therein which in conjunction with said first-named resistors determine the fraction of the output of said second electron device which is fed back at a given gain of said latter device, and means for integrating and rectifying the amplified video output signals from said pickup device and impressing said rectified output on the conduction-control electrode of said second electron discharge device.

References Cited in the file of this patent

UNITED STATES PATENTS

| | | |
|---|---|---|
| 2,216,997 | Lewis | Oct. 8, 1940 |
| 2,398,596 | Price | Apr. 16, 1946 |
| 2,420,249 | Korman | May 6, 1947 |
| 2,428,039 | Royden | Sept. 30, 1947 |
| 2,481,533 | Pratt | Sept. 13, 1949 |
| 2,623,996 | Gray | Dec. 30, 1952 |
| 2,721,909 | Davies | Oct. 25, 1955 |
| 2,777,018 | Russell | Jan. 8, 1957 |
| 2,857,481 | Phillips | Oct. 21, 1958 |